Sept. 24, 1957 R. T. CORNELIUS 2,807,483
SHAFT SEALS
Filed Jan. 12, 1956

INVENTOR
RICHARD T. CORNELIUS

ATTORNEYS

United States Patent Office 2,807,483
Patented Sept. 24, 1957

2,807,483

SHAFT SEALS

Richard T. Cornelius, Minneapolis, Minn.

Application January 12, 1956, Serial No. 558,747

6 Claims. (Cl. 286—11.16)

The herein disclosed invention relates to shaft seals and has for an object to provide a seal which may incorporate a housing formed as an integral part of a bearing or which may be built into a separate housing and as a unit installed in a recess in a structure through which the shaft extends.

Another object of the invention resides in providing a shaft seal which engages the shaft over an extremely small area.

Another object of the invention resides in providing a shaft seal in which a minimum amount of heat is generated.

An object of the invention resides in providing a shaft seal which will stand high pressures and high speed.

A still further object of the invention resides in providing a seal utilizing a sealing ring, sheet-like in form and of extremely thin thickness.

Another object of the invention resides in providing clamping means for holding the outer marginal portion of the sealing ring from movement.

An object of the invention resides in providing a housing having a bore therein and through which the shaft extends and in further forming the housing with an annular radial surface extending outwardly from the bore and with a cylindrical surface concentric with the bore and extending axially from the outer periphery of the radial surface to form an annular recess in the housing.

A still further object of the invention resides in mounting in said recess an annular retainer received between the shaft and cylindrical surface of the housing and having spaced cylindrical skirts forming an annular channel therebetween and with radial surfaces at the ends of said skirts spaced from said radial surface of the housing to receive the sealing member therebetween.

An object of the invention resides in constructing the inner skirt so as to form with the radial surface of the housing a guide for guiding the inner marginal portion of the sealing ring for radial movement and the outer skirt longer than the inner skirt so as to form with the housing a clamp securing the outer marginal portion of the sealing ring from movement.

A still further object of the invention resides in providing the sealing ring with an annular bulge extending into said annular channel and in disposing in said channel an annular spring, bearing on said bulge and adapted to urge the inner marginal portion of the sealing ring against the shaft.

Another object of the invention resides in providing passageways through the retainer and sealing ring to equalize the pressure on both sides of the sealing ring.

Other objects of the invention reside in the novel combination and arrangement of parts and in the details of construction hereinafter illustrated and/or described.

Figure 1:
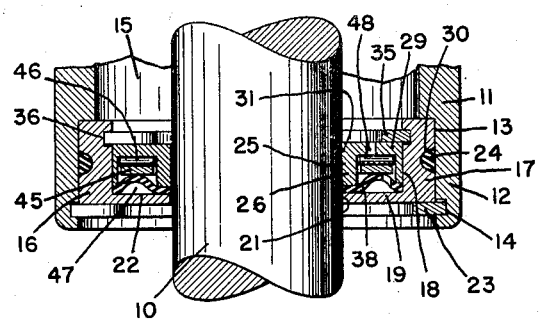
Fig. 1 is a longitudinal sectional view of a shaft and an enclosing structure therefor illustrating an embodiment of the invention applied thereto.

Ordinary shaft seals usually have an extended surface of flexible material engaging the shaft. Where the pressures are great and the speed high, the friction between such surfaces and the shaft becomes excessive and an undue amount of heat is generated. This frequently causes the seals to fail in a relatively short time. The instant invention overcomes this disadvantage by providing a construction in which the contact of the sealing ring with the shaft is extremely small so that the heat generated is negligible and so that the life of the seal is greatly extended.

For the purpose of illustrating the invention, a shaft 10 has been shown together with a portion 12 of a case 11. This portion is in the form of a circular sleeve encircling the shaft and being disposed in proximity to a bearing, not illustrated. This sleeve is constructed with an annular rabbet 13 concentric with the axis of the shaft and having a groove 14 near its outermost end. The interior of the case is designated by the reference numeral 15.

The invention proper consists of a housing 16 which is snugly received in the rabbet 13 in case 11. This housing has a cylindrical portion 17 which fits in said rabbet and which is constructed with an inner cylindrical surface 18. The said case is further constructed with a radial portion 19 which is formed with a bore 21 snugly receiving the shaft 10. The said radial portion is further formed with a radial inner surface 22 which extends from the bore 21 up to the surface 18 of the portion 17 of housing 16. The housing 16 is held in position in the rabbet 13 by means of a split ring 23 which is received in the groove 14. An O-ring 24 mounted in a groove 30 in the portion 17 of the housing engages the portion 12 of case 11 at the surface of the rabbet 13 and prevents leakage past the seal.

Figure 4:
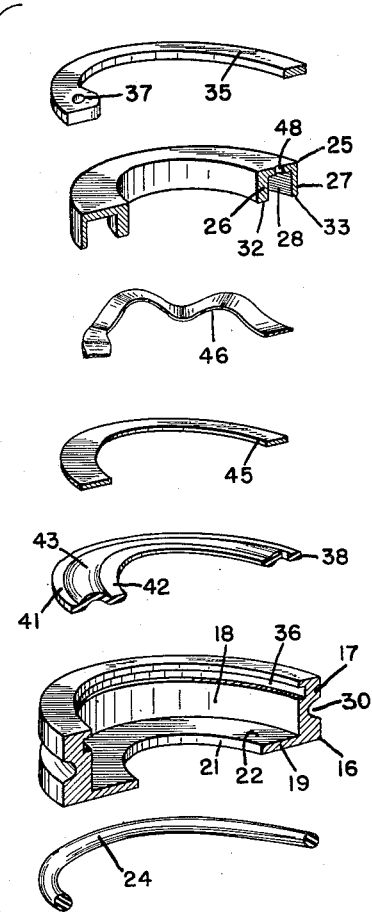
Fig. 4 is an exploded view of the parts of the invention.

Mounted in the housing 16 is a retainer 25 which is constructed with two skirts 26 and 27 concentric relative to one another and to the axis of shaft 10. These skirts are cylindrical in form and spaced from one another to provide a channel 28 therebetween. The said retainer further has a connecting portion 29 which extends between the two skirts 26 and 27. The retainer 25 is also formed with a bore 31 which receives the shaft 10. The skirt 27 fits snugly against the surface 18 of housing 16 and the retainer is guided for sliding movement in axial direction thereby. The skirt 26 has a radial surface 32 at the end of the same and the skirt 27 has a similar radial surface 33 at its end. The surface 33 projects slightly beyond the surface 32 for a purpose which will be presently described. The surface 32 is spaced from the surface 22 to form a guideway 34 therebetween. The retainer 25 is held in position in the housing 16 by means of a split ring 35 which is received in a groove 36 formed in the cylindrical portion 17 of the housing and which extends through the surface 18 of the same. This ring is formed at its ends with eyes 37, one of which is shown in Fig. 4. These eyes serve to permit of removal of the ring from the groove 36 when it becomes necessary to disengage the parts from one another.

Figure 3:
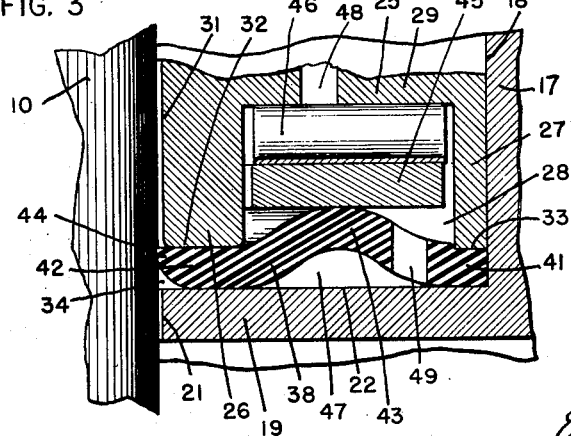
Fig. 3 is an enlarged detail cross-sectional view of the seal showing the parts arranged as in Fig. 1.

Disposed in the space between the surfaces 32 and 33 of the skirts 26 and 27 of the retainer 25 and the surface 22 of the portion 19 of housing 16 is a flexible sheet-like sealing ring 38. This ring may be constructed of rubber or any other similar suitable flexible material. The ring is formed with inner and outer radial portions 41 and 42 and with an annular hump 43 therebetween. The radial portion 41 fits in the guideway 34 and is guided for radial movement in said guideway by means of the surface 22 of the housing and the surface 32 of the retainer. The inner radial portion 42 is clamped in position between the surface 22 of the housing and the surface 33 of the skirt 27. The hump 43 of sealing ring 38 extends into the channel 28 as best shown in Fig. 3. The inner edge 44 of the radial portion 41 of said ring is formed pointed, as illustrated, so that the same engages the shaft throughout an extremely small area. By guiding the ring 38 at the locality of the shaft, an extremely thin ring can be employed and still prevent leakage past the seal. It has been found that a ring constructed of material between .025 inch and .035 inch thick, operates satisfactorily with a shaft one and one-quarter inches in diameter. Such an installation has been run at a speed of 5000 R. P. M. with an internal pressure of one hundred pounds for an extended period of time and without appreciable leakage.

Pressure is applied to the hump 43 of sealing ring 38 by means of an equalizer ring 45 which is disposed within the channel 28 and which overlies and directly engages said hump. Between this ring and the connecting portion 29 of the retainer 25 is an annular undulated spring 46 which exerts pressure on the ring 45 and correspondingly urges the hump 43 toward the surface 22 of housing 16. This forces the inner edge 44 of the sealing ring 38 against the shaft 10 and prevents leakage therebetween.

The space between the hump 43 of the sealing ring 38 and the surface 22 of housing 16 is designated in Fig. 3 by the reference numeral 47. This space communicates with the interior 15 of the case 11 in the following manner: A passageway 48 in the connecting portion 29 of retainer 25 brings the interior 15 of the case 11 into communication with the channel 28 in said retainer, the ring 45 and the spring 46 being sufficiently spaced from the skirts 26 and 27 to provide passage therebetween. The channel 28 is brought into communication with the space 47 by means of a passageway 49 in the sealing ring 38. By means of this construction, the pressure on both sides of the sealing ring is equalized and undue strain on the sealing ring which might be produced by the pressure in the case is eliminated.

Figure 2:
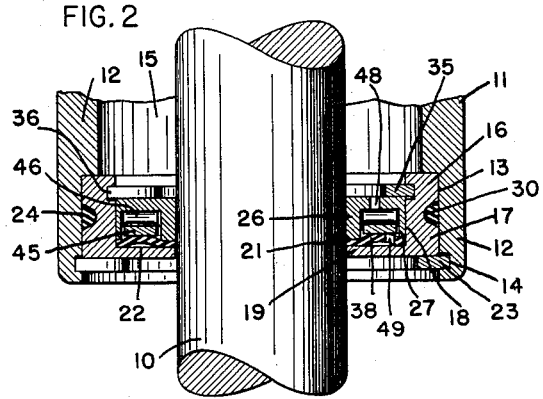
Fig. 2 is a view similar to Fig. 1 showing the parts after the sealing ring has appreciably worn.

The advantages of the invention are manifest. The hump 43 of the sealing ring is normally relatively large as shown in Fig. 1. As the ring wears, the spring 36 forces the hump 43 downwardly, as shown in Fig. 2, still maintaining the edge 44 of the sealing ring in contact with the shaft. Thus the life of the seal is greatly lengthened. The outer end of the ring being securely clamped by the skirt 27 is held from movement. At the same time the surfaces 32 and 22 form a guideway for guiding the inner portion of the ring toward the shaft. By means of this guideway the thickness of the ring can be made extremely small and at the same time afford a suitable seal capable of withstanding high pressure and high speed. The device can be constructed at a nominal expense and can be readily replaced when required.

Changes in the specific form of the invention, as herein described, may be made within the scope of what is claimed without departing from the spirit of the invention.

Having described the invention, what is claimed as new and desired to be protected by Letters Patent is:

1. In a shaft seal, a housing having a bore therethrough, a radial surface extending outwardly from said bore and a cylindrical surface extending axially from said radial surface at its outer periphery, an annular retainer received in said housing and disposed adjacent said cylindrical surface, said retainer having spaced cylindrical skirts with radial surfaces at their ends and forming an annular channel within said retainer, an annular resilient sealing ring, sheet-like in form and engaging at its inner and outer marginal portions the radial surface of the housing, said sealing ring being confined between the radial surface of the housing and the radial end surfaces of the skirts of said retainer and having an annular bulge extending into said channel, and resilient means within said channel engaging said sealing ring at said bulge and urging the same toward the radial surface of the housing to urge the inner edge of said seal radially inwardly.

2. A shaft seal according to claim 1 wherein the outer skirt of said retainer forms a clamp engaging the outer marginal portion of the sealing ring and urges the same against the radial surface of the housing to prevent movement therebetween.

3. In a shaft seal, a housing having a bore therethrough, a radial surface extending outwardly from said bore and a cylindrical surface extending axially from said radial surface at its outer periphery, an annular resilient sheetlike sealing ring having inner and outer radial portions with an annular hump therebetween, said radial portions engaging the radial surface of said housing, guide means engaging said inner radial portion and forming with the radial surface of the housing a guideway in which said portion of the sealing ring may move in radial directions, clamp means engaging the outer radial portion of the sealing ring to hold the same from movement and resilient means urging said hump toward the radial surface of the housing to cause the inner radial portion of the sealing ring to move in said guideway toward the shaft.

4. In a shaft seal, a housing having a bore therethrough, a radial surface extending outwardly from said bore and a cylindrical surface extending axially from said radial surface at its outer periphery, an annular resilient sheetlike sealing ring having inner and outer radial portions with an annular hump therebetween, said radial portions engaging the radial surface of said housing, said hump forming an annular space between said sealing ring and radial surface of the housing, said sealing ring having a passageway therethrough bringing said space formed by the hump into communication with the interior of the housing.

5. In a shaft seal, a housing having a bore therethrough, a radial surface extending outwardly from said bore and a cylindrical surface extending axially from said radial surface at its outer periphery, an annular retainer received in said housing and disposed adjacent said cylindrical surface, said retainer having spaced cylindrical skirts with radial surfaces at their ends and forming an annular channel within said retainer, an annular resilient sealing ring, sheet-like in form and engaging at its inner and outer marginal portions the radial surface of the housing, said sealing ring being confined between the radial surface of the housing and the radial end surfaces of the skirts of said retainer and having an annular bulge extending into said channel, said bulge forming an annular space between the sealing ring and the radial surface of said housing, said retainer having a passageway therethrough bringing said channel into communication with the interior of the housing and said sealing ring having a passageway therethrough bringing said channel into communication with the space formed by said hump.

6. In combination with a shaft, a seal therefor comprising a housing having a bore therethrough and receiving said shaft, said housing having a radial surface extending outwardly from said bore and a cylindrical surface extending axially from said radial surface at its outer periphery, an annular retainer received in said housing and disposed adjacent said cylindrical surface, said retainer having spaced cylindrical skirts with radial surfaces at their ends and forming an annular channel within said retainer, an annular resilient sealing ring, sheetlike in form having a bore receiving said shaft and engaging at its inner and outer marginal portions the radial surface of the housing, said sealing ring being confined between the radial surface of the housing and the radial end surfaces of the skirts of said retainer and the radial surfaces of the housing together with the end surface of the inner skirt of said retainer lying close to the shaft and guiding the inner marginal portion of the sealing ring for radial movement and restraining axial movement of the sealing ring along the shaft, said retainer having an annular bulge extending into said channel, and resilient means within said channel engaging said sealing ring at said bulge and urging the same toward the radial surface of the housing to urge the inner edge of said seal radially inwardly against the shaft.

References Cited in the file of this patent

UNITED STATES PATENTS

| | | |
|---|---|---|
| 1,956,366 | Vedovell | Apr. 24, 1934 |
| 2,311,494 | Vedovell | Feb. 16, 1943 |
| 2,445,410 | Smith | July 20, 1948 |
| 2,521,102 | Vedovell | Sept. 5, 1950 |
| 2,592,494 | Ullmann | Apr. 8, 1952 |
| 2,593,899 | Krug | Apr. 22, 1952 |